(12) United States Patent
Lutz

(10) Patent No.: US 12,379,708 B2
(45) Date of Patent: Aug. 5, 2025

(54) SYSTEMS AND METHODS FOR COMPUTER-AIDED MACHINING

(71) Applicant: Siemens Aktiengesellschaft, Munich (DE)

(72) Inventor: Benjamin Samuel Lutz, Großenseebach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/860,056

(22) PCT Filed: Apr. 19, 2023

(86) PCT No.: PCT/EP2023/060090
§ 371 (c)(1),
(2) Date: Oct. 25, 2024

(87) PCT Pub. No.: WO2023/208675
PCT Pub. Date: Nov. 2, 2023

(65) Prior Publication Data
US 2025/0110470 A1    Apr. 3, 2025

(30) Foreign Application Priority Data
Apr. 27, 2022   (EP) ................................. 22170209

(51) Int. Cl.
G05B 19/4065    (2006.01)
G05B 19/4097    (2006.01)
(Continued)

(52) U.S. Cl.
CPC ..... *G05B 19/4065* (2013.01); *G05B 19/4097* (2013.01); *G06T 7/0004* (2013.01);
(Continued)

(58) Field of Classification Search
None
See application file for complete search history.

(56) References Cited

U.S. PATENT DOCUMENTS

| | | | | |
|---|---|---|---|---|
| 5,903,474 A | * | 5/1999 | Sadler | G05B 19/40938 703/2 |
| 7,603,289 B2 | * | 10/2009 | Kriedler | G06Q 10/20 700/83 |

(Continued)

FOREIGN PATENT DOCUMENTS

| | | |
|---|---|---|
| CN | 110569586 | 12/2019 |
| CN | 112486097 | 3/2021 |

(Continued)

OTHER PUBLICATIONS

PCT International Search Report dated Jul. 14, 2023 based on PCT/EP2023/060090 filed Apr. 19, 2023.

*Primary Examiner* — Jason Lin
(74) *Attorney, Agent, or Firm* — Cozen O'Connor

(57) ABSTRACT

Systems methods for computer-aided machining includes A) providing a material batch with an undetermined machinability to a machining tool, B) specifying a set of machining conditions having a machining speed, C) inserting a tool that has a predetermined type and a predetermined wear into the machining tool, D) machining the material batch with the machining tool, monitoring wear of the inserted tool during the machining, and determining a first tool life of the tool, E) repeating Steps B, C and D to determine a second tool life, while setting a different machining speed in Step B and inserting a tool of the same type in Step C, F) determining coefficients of a model associated with the material batch, based on the machining speed, the different machining speed, the first and the second tool life, and G) determining machinability of the material batch based on the model.

26 Claims, 3 Drawing Sheets

(51) Int. Cl.
  *G06T 7/00* (2017.01)
  *G06T 7/10* (2017.01)
(52) U.S. Cl.
  CPC ...... *G06T 7/10* (2017.01); *G05B 2219/35499* (2013.01); *G05B 2219/37252* (2013.01); *G05B 2219/37256* (2013.01); *G06T 2207/20081* (2013.01); *G06T 2207/30164* (2013.01)

(56) References Cited

U.S. PATENT DOCUMENTS

| | | | | |
|---|---|---|---|---|
| 8,401,677 | B2* | 3/2013 | Landgraf | G05B 19/056 |
| | | | | 700/86 |
| 9,460,170 | B2* | 10/2016 | Boensch | G06F 16/252 |
| 10,564,624 | B2* | 2/2020 | Karandikar | G05B 19/4065 |
| 2002/0007422 | A1* | 1/2002 | Bennett | H04L 41/0226 |
| | | | | 709/246 |
| 2002/0013639 | A1* | 1/2002 | Fujishima | G05B 19/4065 |
| | | | | 700/169 |
| 2002/0083145 | A1* | 6/2002 | Perinpanathan | H04L 67/1095 |
| | | | | 709/219 |
| 2003/0014322 | A1* | 1/2003 | Kreidler | G06Q 10/0637 |
| | | | | 705/305 |
| 2004/0122618 | A1* | 6/2004 | Suzuki | G07C 3/00 |
| | | | | 702/181 |
| 2016/0091393 | A1* | 3/2016 | Liao | G01M 13/00 |
| | | | | 702/34 |
| 2016/0349737 | A1* | 12/2016 | Yen | H04L 67/125 |
| 2017/0364056 | A1* | 12/2017 | Ono | G06F 16/23 |
| 2019/0258222 | A1 | 8/2019 | Karandikar et al. | |

FOREIGN PATENT DOCUMENTS

| | | |
|---|---|---|
| CN | 112632692 | 4/2021 |
| CN | 114091189 | 2/2022 |
| DE | 102020201077 | 7/2021 |

* cited by examiner

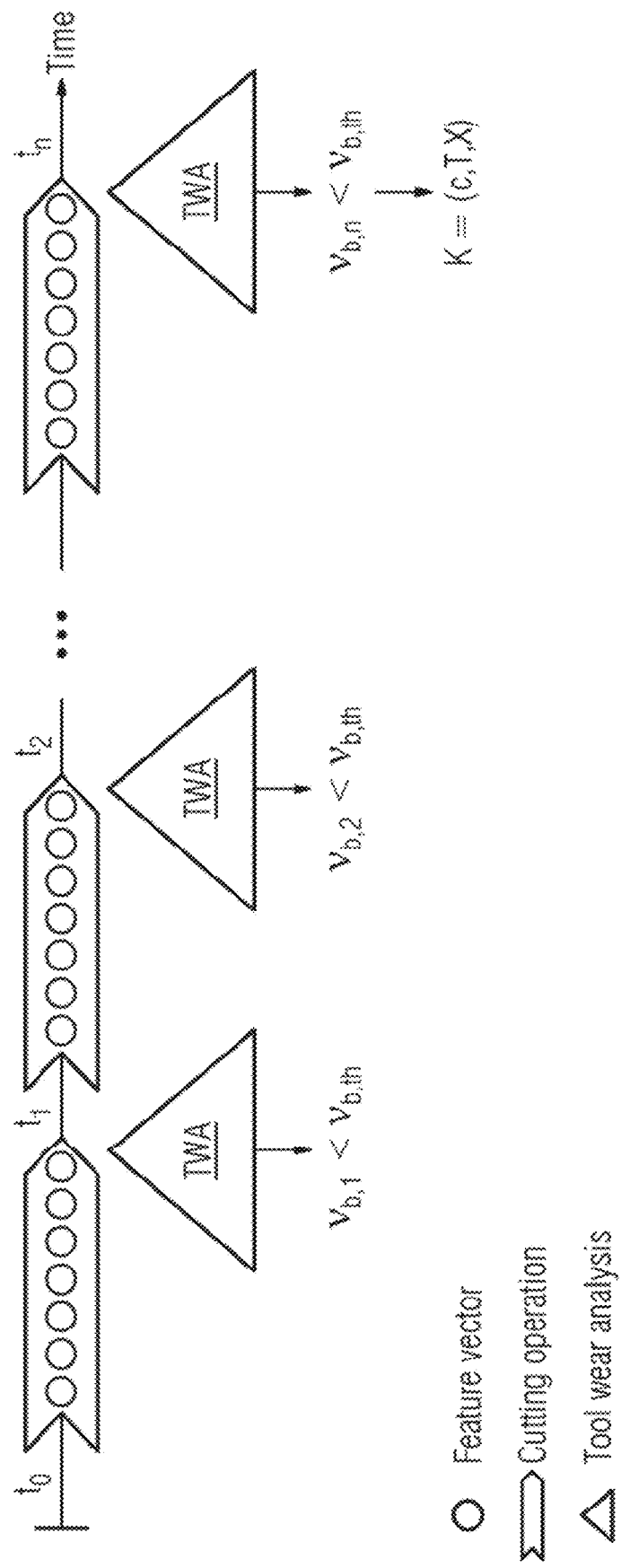

SYSTEMS AND METHODS FOR COMPUTER-AIDED MACHINING

CROSS-REFERENCE TO RELATED APPLICATIONS

This is a U.S. national stage of application No. PCT/EP2023/060090 filed 19 Apr. 2023. Priority is claimed on European Application No. 22170209.5 filed 27 Apr. 2022, the content of which is incorporated herein by reference in its entirety.

BACKGROUND OF THE INVENTION

1. Field of the Invention

The present invention relates to systems and methods for computer-aided machining.

2. Description of the Related Art

In machining, in particular in subtractive machining, e.g., cutting, of metal materials, significant deviations in machinability among material batches of the same specification can be observed.

Methods known from the prior art address this issue, for example, by integrating a classification routine in the machining process that classifies the material during the machining process (see German patent application DE 10 2020 201 077 A1). In DE 10 2020 201 077 A1, a process monitoring system uses look-up tables and a database to find a match for a machining parameter vector collected during the machining. In this way, the machinability of the material is derived from the database. If, however, a material batch is novel, i.e., no match or only a bad match can be found in the database, then little process optimization is possible because no ground-truth data about this material is available.

Machinability can be defined as a property of a workpiece or material to be machinable under given conditions (DIN 6583, 1981, S. 1). For example, it can be quantified by a machinability index, where steel can be used as a reference.

In other words, the machinability is the ease with which a metal can be cut (machined) permitting the removal of the material with a satisfactory finish. Materials with good machinability (free machining materials) require little power to cut, can be cut quickly, easily obtain a good finish, and do not cause significant wear on the tooling.

Up to now in such cases of material batches with unknown behavior material, characterization experiments are performed prior to the actual machining operation to determine the machinability of the respective material batch. This process is rather resource intensive.

SUMMARY OF THE INVENTION

In view of the foregoing, it is therefore and object of the invention to provide a a procedure that allows avoidance of the material characterization process prior to the actual machining process, thereby, eliminating prior testing efforts.

This and other objects and advantages are achieved in accordance with the invention by a computer-aided machining method comprising:
A) providing a material batch, e.g., metal or metal alloy batch with an undetermined machinability to a machining tool,
B) specifying, e.g., fully automatically a set of machining conditions comprising a machining speed,
C) inserting, e.g., fully automatically a tool into the machining tool, where the inserted tool has a predetermined type and a predetermined wear,
D) machining the material batch with the machining tool, monitoring wear of the inserted tool during the machining, and determining a first tool life, e.g., in minutes, of the tool,
E) repeating Steps B, C and D to determine a second tool life, while setting a different machining speed in Step B and inserting a tool of the same type in Step C,
F) determining, e.g., calculating, coefficients of a model associated with or describing the material batch, based on the machining speed, the different machining speed, the first and the second tool life, and the
G) determining machinability of the material batch based on the model.

The coefficients can be called batch-specific coefficients, because they are associated with a particular material batch.

In other words, the model determined in step F is a machinability model for the material batch, which initially had an undetermined machinability.

It will be appreciated by the skilled person, that the term "machining conditions" may refer to any machining parameter (machining speed, axis feed, etc.) and also to any other environmental factor that can affect the machining process, e.g., temperature, humidity, vibration in the machining area, etc.

In an embodiment, while, in Step E, a different machining speed is chosen, the rest of the machining conditions, in particular machining, e.g., cutting parameters can be left unchanged.

In an embodiment, the tools inserted in Step C and in Step E are the same, i.e., two copies of a tool of the same type. In an embodiment, the tools used are both fresh, i.e., unused. In an embodiment, both tools have the same predetermined wear, before they inserted into the machining tool.

It will be appreciated by the skilled person that the term "monitoring wear . . . during machining" has the following meaning in the context of the present disclosure. Machining, e.g., cutting may include one or more interruptions of the process, where the machining is stopped and the wear of the cutting tool is analyzed, e.g., by a computer vision method. If the wear status of the cutting tool is ok, then the machining is resumed.

In an embodiment, the model is a Taylor model. The batch-specific coefficients are coefficients of the Taylor model.

In an embodiment, the machining is cutting and the cutting conditions further comprise a feed rate and/or a cutting depth and the method further comprises:
  determining at least one further tool life of the cutting tool, and
  determining coefficients of an extended model associated with/describing the material batch.

In an embodiment, the extended model is an extended Taylor model.

In a further embodiment, the method further comprises adding the machinability and the coefficients of the model to a knowledge database.

In another embodiment, the tool is a drill, a milling tool, or a cutting tool.

In an embodiment, the determination of the first and/or the second tool life is performed without removing the tool from the machining tool.

In an embodiment, Step D includes sub-steps comprising:
  D1) halting the machining at least once, preferably at regular intervals, D2) acquiring at least one image of the tool, in particular without removing the tool from its position, while the machining is halted, and D3) determining the wear of the tool based on the at least one image of the tool.

In particular, when the determination of the first and/or the second tool life is performed without removing the tool from the machining tool, the time for determining the machinability can be reduced. The halting can be performed every 20-30 seconds and the time for removing the tool from the machining tool and inserting it again to continue machining can be quite considerable.

In an embodiment, Step D3 (determining the wear of the tool based on the at least one image of the tool) includes sub-steps comprising:

D31) segmenting the at least one image of the tool by a trained image segmentation model, D32) calculating a flank wear width of the tool, and D33) determining whether the flank wear width meets a pre-defined flank wear width threshold associated with the wear of the tool.

The image segmentation model can be trained on a training dataset comprising images of tools, whereas each image is associated with one or more tool characteristics and/or defects. Such characteristics and/or defects can be, for example, flank wear (grade of the flank wear), chipping, and/or breaking.

In an embodiment, the training can be performed by providing images of tools, in particular images that show the tools laterally, annotating the images according to the characteristics and/or defects of the tools and generating masks for the images, and training a (untrained) model on the images of tools and generated masks.

The image segmentation model can be based on a pattern recognition algorithm, so that the trained image segmentation model can be based on a trained pattern recognition algorithm.

It should be appreciated that the image segmentation model can also be based on untrained algorithms or trained neural networks, trained to determine a wear of the tool, in particular by determining its flank wear.

In an embodiment, the method further comprises determining machining parameter based on the machinability of the material batch and machining the material batch.

The objects and advantages are also achieved in accordance with the invention by a computer program comprising instructions which, when the program is executed by a computing device associated with a machining tool, cause the computing device and the machining tool to perform the method in accordance with the disclosed embodiments.

The objects and advantages are also achieved in accordance with the invention by a computing device comprising such a computer program.

In an embodiment, the computing device comprises an edge device, in particular an edge device connected (communicatively and/or operatively) to a numerical control device, e.g., a computer numerical control (CNC).

The objects and advantages are also achieved in accordance with the invention by a system for machining comprising a machining tool and the above-mentioned computing device associated, e.g., operatively connected with the machining tool.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above and other objects and advantages of the invention will be apparent upon consideration of the following detailed description of certain aspects indicating only a few possible ways which can be practiced. The description is taken in conjunction with the accompanying drawings, in which like reference characters refer to like parts throughout, and in which:

FIG. 3 shows a machining process of determining a tool life.

DETAILED DESCRIPTION OF THE EXEMPLARY EMBODIMENTS

The reference signs used in the figures and in the claims are used for demonstrative purposes and shall not be considered as a limitation of corresponding claim features.

Figure 1:
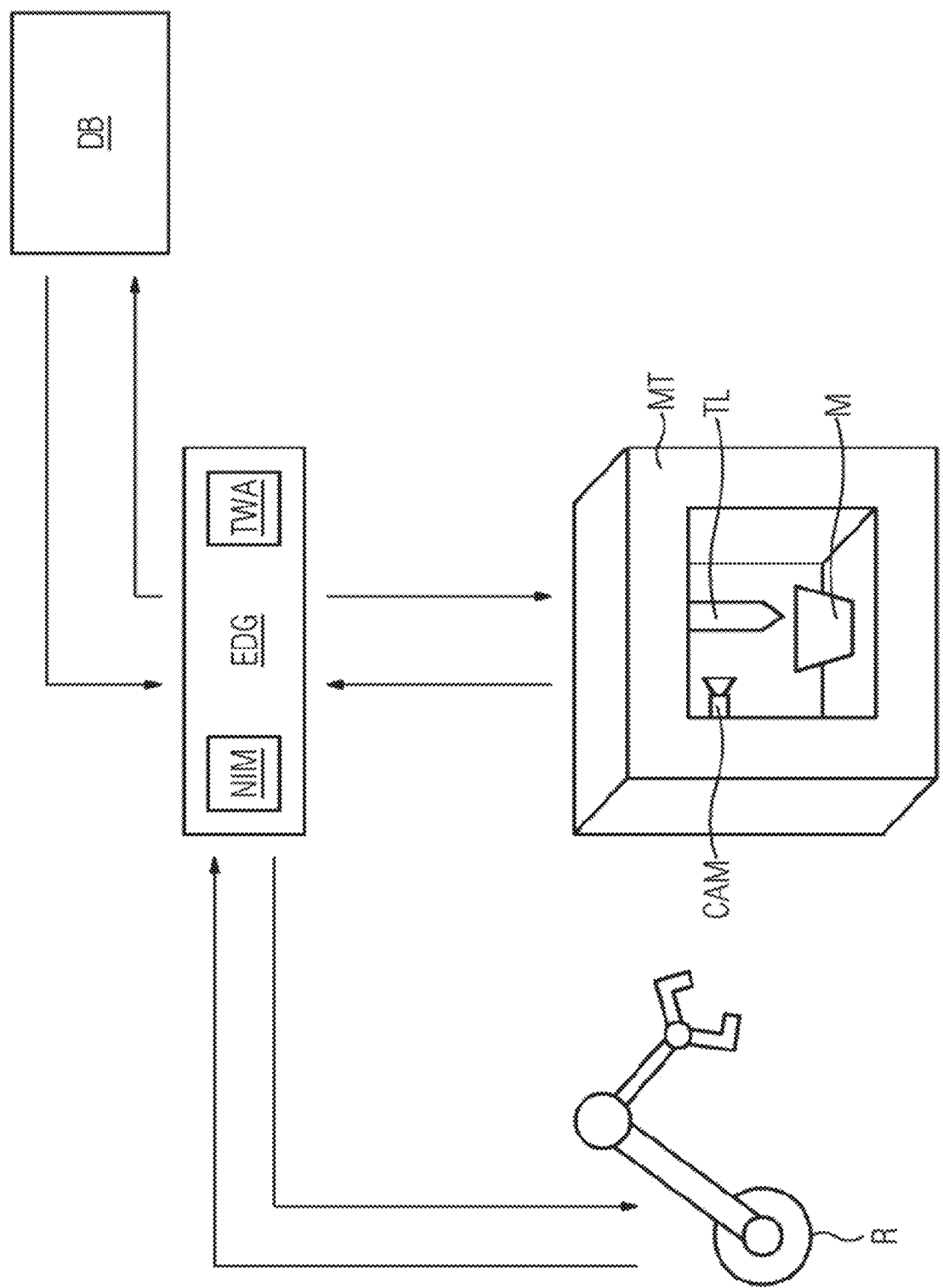
FIG. 1 illustrates a system for machining a material batch.

FIG. 1 illustrates a system upon which the methods disclosed herein can be implemented. The system comprises a machining tool MT for machining, e.g., subtractive machining, such as milling, drilling, and/or cutting. In particular, the machining tool MT is a CNC machining tool.

In the machining tool MT there is (a piece of) a material batch M that is to be machined by a tool TL inserted in the machining tool MT. The tool can be, e.g., a cutting tool.

The machining tool MT usually comprises one or more spindles (not shown here for simplicity) that are driven by feed drives, e.g., motors during machining.

The system further comprises an edge device EDG that is communicatively and, in particular also operatively coupled to the machining tool MT.

The edge device EDG is adapted and configured to receive machining data from the machining tool and in particular also configured to control the machining tool. In the latter case, the edge device EDG may have a functionality of an NC-device for the machining tool. It (the edge device EDG) can be also established to comprise the NC-device of the machining tool MT.

The data that the edge device EDG receives may comprise signals for each spindle and feed drive, e.g., position, current, acceleration, and/or torque. Such signals can be NC signals, i.e., coming from the NC device (not shown here for simplicity) of the machining tool MT.

The system may also comprise a (digital) camera CAM for computer vision purposes. The camera CAM may be carried by the machining tool MT, e.g., for grabbing pictures and/or videos in-situ, e.g., during the machining process or during the pauses in the machining process.

In particular, the camera CAM can be configured to take images of the tool TL to analyse its wear. To perform the tool wear analysis, the edge device EDG can comprise an executable routine, a software TWA, e.g., in form of an app, that can be run on the edged device and comprises instructions, which when executed by the edge device EDG implement an algorithm that analyses the wear of the tool TL. The algorithm can be based on a function or model that was, for example, previously trained on a predetermined training set of image data associated with tool's wear. In an embodiment, the function or model can perform a best match with images from a database DB associated with the system and in particular with the edge device EDG to determine the wear of the tool TL. For that the images in the database DB can be labelled accordingly. Such images can be also used to train the function or model mentioned earlier, i.e., the predetermined training set can comprise or consist of images of/from the database DB. The term "predetermined" may refer to the labels or label values of the images that are chosen for the training. For example, only images whose label has a flank wear value above (or below) some determined threshold may be chosen to form the training dataset.

Often, edge devices EDG considered in the context of the present disclosure are regarded as industrial computers. It means they comprise all usual functionalities of such industrial computers, interfaces such as communication interfaces, software and so on and so forth.

Figure 2:
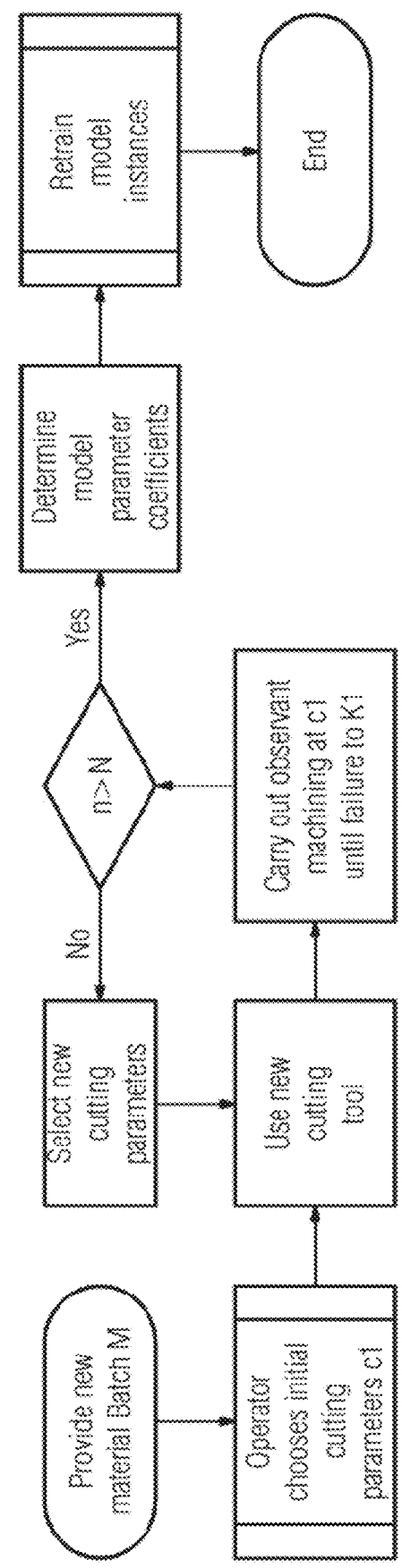
FIG. 2 shows a flowchart of a machining method.

With respect to FIG. 2, the machining method disclosed herein begins by providing a material batch with an undetermined machinability to a machining tool (Step A). The material can be a metal or a metal alloy.

This can be performed fully automatically. For example, the edge device can be in communication with a robot R and be configured to command the robot R to grab a piece of a material M and to put it in to the machining tool MT.

It will be appreciated by the skilled person that two-way arrows mean two-way communication.

The edge device EDG can also comprise a software module or a program NIM configured for determining whether the material batch M has novel behaviour, i.e., its machinability is unknown implying that the optimal machining parameter for this material batch M are to be determined.

This novelty identification module NIM can be based on a trained model (e.g., a novelty detection model). In particular, the novelty detection model can be trained on a set of historic data associated with a respective machining state so that the novelty detection model computes a score (e.g., a novelty score), and yields high scores for data points, i.e., data points (current, voltage, axis and/or tool centre point positions, torque) at a particular time, which match the distribution of the historic data and low scores for data points that do not match the distribution. In other words, novelty of a sample M of the material batch can be expressed by the novelty score. Novelty scores that are above some predetermined threshold but within a decision boundary, thus considered known, while samples that fall outside the decision boundary are considered novel. In this way, the novelty of the material batch M can be determined fully automatically.

The machining state can be defined as a plurality of (all) machining parameters that are adjustable fully automatically or by an operator (e.g., axis feed, etc.)

Otherwise, the novelty of the material batch M can be determined by an operator of the machining tool MT. The material batch can be simply marked as having an undetermined machinability.

In what follows, a particular example of cutting will be considered. However, in view of the above, it will be appreciated that this example can be extended to any type of machining mentioned with respect to the machining tool MT.

Referring to FIG. 2, the next step of the method (Step B) constitutes specifying a (first) set of machining (here cutting) conditions c1 comprising a machining (here cutting) speed. This can be performed either fully automatically based, e.g., on a historical data that may comprise an expert's knowledge, or by an operator. For example, the operator can asked to choose an initial set of cutting conditions c1.

Given the set of initial cutting conditions c1, a fresh cutting tool TL is inserted (Step C). The insertion itself can be performed fully automatically by the machining tool MT, or the operator can initiate the procedure of inserting the tool TL. It will be appreciated that the cutting tool TL does not have to be fresh or unused. It must, however, have a predetermined or known type and must have a predetermined degree of wear.

In a further step (Step D), the material batch M is machined with the cutting tool. Throughout the machining process, the monitoring of the tool and the analysis of its wear is executed, where the process is stopped once the cutting tool is worn out and, therefore, the tool life Tc1 of the tool is determined. That is, in order to perform the tool wear analysis, the edge device EDG with the app TWA can be used.

In an embodiment, the cutting process is halted to take an image of the tool with the camera CAM. It will be appreciated by the skilled person that the cutting process can be halted several times to analyze the wear of the tool TL. Preferably, the process is halted at regular intervals. The image acquisition can be performed without removing the tool TL from the machining tool MT. Based on the acquired image of the tool, the wear of the tool can be determined by the tool wear analysis software TWA. As mentioned above, the tool wear analysis software TWA can comprise a trained function or perform a best match comparison to determine the wear of the tool TL.

In an embodiment, determining the tool wear based on the at least one image of the tool comprises segmenting the at least one image of the tool by a trained image segmentation model, calculating a flank wear width of the tool, and determining whether the flank wear width meets a predefined flank wear width threshold associated with the wear of the tool.

The image segmentation model can be trained, as explained above, on a predetermined dataset of images, where each image is associated to a characteristic and/or defect of the tool T, e.g., flank wear, chipping, and/or breakage. The image segmentation model can be based on a pattern recognition algorithm. Once the measured flank wear width meets a predefined threshold $v_{b,th}$, the tool is considered worn out and the tool life Tc1 is determined.

While machining, a tuple $\mathcal{K}1$ of ground-truth data can be yielded consisting of the selected cutting conditions c1, the respective achieved tool life Tc1, and the feature vectors Xc1 computed from the observed process data. By doing this, initial information about the machinability of the novel material batch M at c1 is obtained. For example, the tuple $\mathcal{K}1$ can be stored in the database DB to train/improve model(s) that is (are) used in the novelty identification module NIM and/or in classifiers (as in DE 10 2020 201 077 A1) of material batches.

In an embodiment, the operator can be asked, whether there is already enough information to determine a model that can be used to determine machinability of the material batch. It will be appreciated by the skilled person that the step can also be performed in a fully automatic way. In FIG. 2, "n" denotes the number of performed runs performed during the machining process, e.g., the number of the tool lives measured, whereas "N" denotes the number of the runs needed to derive a model.

For example, a simple Taylors model can be used. To enable process optimization based on Taylors model, at least two support points, thus tool life at different cutting conditions, are needed.

Therefore, in the next step (Step E) another fresh or unused cutting tool is inserted, where the other cutting tool is of the same tool type as the previous cutting tool. It will be appreciated by the skilled person that another tool does not have to be new but has to be of a predetermined wear.

Further, the material batch is machined by using another cutting conditions $c_2$ including cutting speed $v_{c2}$ and the wear of the another tool is monitored to determine a second tool life Tc2.

In an embodiment, the second cutting conditions $c_2$ differ from the first cutting conditions $c_1$ only in the cutting speed $v_c$, while the remaining cutting conditions are kept constant.

In the next step (Step F), parameters of the Taylors model are determined based on the first and second cutting speeds ($v_{c1}$ and $v_{c2}$) and the first and the second tool life (Tc1 and Tc2). The calculated parameters determine the Taylors model associated with the material batch M that has been machined as described above.

In other words, a machinability model for the unknown material batch is established. This model can be stored in the database DB for further use.

In the next step (Step G), the machinability of the material batch M can be determined based on the Taylor model.

The above is with regards to the simplest case of the Taylor model that needs only two support points. In this case, only two runs during the machining process are needed.

In an embodiment, an extended Taylor model can be used that includes other cutting conditions, e.g., feed rates f and cutting depths $a_p$, as variables.

The extended Taylor model with coefficients m, n and q:

$$\ln T = \ln c_t + m\ln v_c + n\ln f + q\ln a_p$$

In order to determine the parameters of the extended Taylor model, more support points N, i.e., more cutting runs during the machining process, are needed. The number of the support points depends on the number of model parameter coefficients.

Different feed rates f and/or cutting depths $a_p$ can be selected only when using the extended Taylor model.

Once the minimum amount N of support points $\mathcal{K}$ are generated, these can be used to compute the respective model parameters of the Taylor model.

In an embodiment, a dataset comprising tool life and cutting conditions $v_c$, f, and $a_p$ can be used to optimize a linear regression model using least squared error to approximate the coefficient parameters $c_t$, m, n, and q of the transformed extended Taylor model.

The coefficient parameters can then be added to the knowledge base DB as new instances for novelty detection and/or better classification models for further training (see FIG. 2).

In an embodiment, the initial set of cutting conditions (c) is kept constant for the remainder of the cut to ensure a constant machining state, when the tool life is determined.

Turning to FIG. 3, a machining process for determining a tool life is illustrated in more detail. FIG. 3 illustrates how a single support point $\mathcal{K}$ is acquired.

As discussed above, the cutting process begins at $t_0$ and can be halted at regular intervals $t_1, t_2, \ldots t_n$. When the cutting process is halted, the tool wear analysis TWA is performed. The cutting tool is moved in front of the image acquisition unit CAM (see FIG. 1), or the image acquisition unit CAM is moved into position to acquire an image of the tool TL. A picture of the cutting tool is obtained, segmented by the image segmentation model, and used to calculate the flank wear width $v_{b,1}$. The flank wear $v_{b,1}$ is compared to a predefined threshold $v_{b,th}$. If the threshold is reached, then the tool is worn out. The above-described procedure is repeated every time when the machining process is interrupted. The flank wear values $v_{b,2}, \ldots v_{b,n}$ are measured/determined and compared to the threshold value $v_{b,th}$ until this value is reached. When the threshold value $v_{b,th}$ is reached the total machining time $t_m$ defines the tool life T.

In an embodiment, the set of all detected wear defects can be stored in the database DB and/or shown to the operator for manual machinability assessment. In parallel, the feature vectors (shown as circles FIG. 3) and, preferably, the total machining time $t_m$ computed from the process data are stored, e.g., in the database DB.

At the end of the process, when the tool life T is determined, the set of ground-truth information $\mathcal{K}$ consisting of the tool life reached T at cutting conditions c with the observed feature vectors X is provided and, preferably, stored in the database DB.

In summary, the disclosed embodiments of the method can be fully automated material characterization routines or automated material characterization routines that guide the operator through the automated procedure for characterizing the machinability of a novel material batch.

The disclosed embodiments of the methods and systems allow integration of the steps of material batch characterization into the machining process, because not all material batch variations are known prior to machining. By integrating material batch characterization into the machining process, testing efforts, thus costs, can be reduced. Furthermore, a technical system is thereby capable of assessing novel material batches on its own without the need for consulting a technical expert and asking her or him to characterize the material batch of the unknown machinability.

After the novel material batch is characterized, a proposal of optimized machining parameters can be made to the operator or adopted by the control of the machining tool.

It will be appreciated by the skilled person that there are several approaches for describing the machinability of a material.

In this disclosure, the machinability assessment based on tool life is used as ground truth machinability data. For this method of machinability determination, the wear of the cutting tool is monitored in relation to the tool life. As the rate of tool wear typically depends on the cutting conditions, at least the machining speed needs to be considered. While the usage time of the tool can be derived from the meta data of the machining operation, the tool condition/tool wear can be acquired using a visual tool condition monitoring system.

The above-described embodiments of the present disclosure are presented for purposes of illustration and not of limitation. In particular, the embodiments described with regard to figures are only few examples of the embodiments described in the introductory part. Technical features that are described with regard to systems can be applied to augment methods disclosed herein and vice versa.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-aided machining method comprising:
    A) providing a material batch with an undetermined machinability to a machining tool;
    B) specifying a set of machining conditions comprising a machining speed;
    C) inserting a first tool into the machining tool, the inserted tool being a predetermined type and having a predetermined wear;
    D) machining the material batch with the machining tool, monitoring wear of the inserted tool during the machining, and determining a first tool life of the tool;
    E) repeating Steps B, C and D to determine a second tool life, while setting a different machining speed in Step B and inserting a second tool, the first and second tools being the same type;
    F) determining coefficients of a model associated with the material batch, based on the machining speed, the different machining speed, the first and the second tool life; and
    G) determining machinability of the material batch based on the model.

2. The method of claim 1, wherein the model is a Taylor model.

3. The method of claim 2, wherein the machining is cutting; and conditions of the cutting comprise at least one of a feed rate and a cutting depth, the method further comprising: determining at least one further tool life; and determining coefficients of an extended model associated with or describing the material batch; wherein the extended model is an extended Taylor model.

4. The method of claim 2, wherein, during Step E, a different machining speed is chosen, the rest of the machining conditions are maintained unchanged.

5. The method of claim 1, wherein the machining is cutting; and conditions of the cutting comprise at least one of a feed rate and a cutting depth, the method further comprising: determining at least one further tool life; and determining coefficients of an extended model associated with or describing the material batch; wherein the extended model is an extended Taylor model.

6. The method of claim 5, wherein, during Step E, a different machining speed is chosen, the rest of the machining conditions are maintained unchanged.

7. The method of claim 1, wherein, during Step E, a different machining speed is chosen, the rest of the machining conditions are maintained unchanged.

8. The method of claim 1, wherein using copies of the same tool are utilized during Step C and during Step E.

9. The method of claim 8, wherein the copies are unused copies or copies of the same predetermined wear.

10. The method of claim 1, further comprising:
    adding the machinability and the coefficients of the model to a knowledge database.

11. The method of claim 1, wherein at least one of the first tool and the second tool is one of a drill, a milling tool and a cutting tool.

12. The method of claim 1, wherein the determining of at least of the first tool life and the second tool life is performed without removing the first tool or the second tool from the machining tool.

13. The method of claim 1, wherein Step D includes sub-steps comprising:
    D1) halting the machining at least once at regular intervals;
    D2) acquiring at least one image of the first tool or the second tool, while the machining is halted; and
    D3) determining the wear of the tool based on the at least one image of the first tool or the second tool.

14. The method of claim 13, wherein Step D3 includes sub-steps comprising:
    D31) segmenting the at least one image of the first tool or the second tool via a trained image segmentation model;
    D32) calculating a flank wear width of the first tool or the second tool; and
    D33) determining whether the flank wear width meets a pre-defined flank wear width threshold associated with the wear of the first tool or the second tool.

15. The method of claim 14, wherein the image segmentation model is pre-trained on a training dataset comprising images of tools, each image being associated with at least one tool characteristics and/or defects.

16. The method of claim 15, wherein the training is performed by providing images of tools comprising images that show the tools laterally, annotating the images in accordance with at least one of characteristics and defects of the first tool or the second tool and generating masks for the images, and training a model on the images of tools and generated masks.

17. The method of claim 15, wherein the image segmentation model is based on a pattern recognition algorithm.

18. The method of claim 14, wherein the training is performed by providing images of tools comprising images that show the first tool or the second tool laterally, annotating the images in accordance with at least one of characteristics and defects of the tools and generating masks for the images, and training a model on the images of tools and generated masks.

19. The method of claim 18, wherein the image segmentation model is based on a pattern recognition algorithm.

20. The method of claim 14, wherein the image segmentation model is based on a pattern recognition algorithm.

21. The method of claim 1, further comprising:
    determining a machining parameter based on the machinability of the material batch and machining the material batch.

22. A computing device comprising;
    a processor; and memory;
    wherein the processor is configured to:
    A) provide a material batch with an undetermined machinability to a machining tool;
    B) specify a set of machining conditions comprising a machining speed;
    C) insert a first tool into the machining tool, the inserted tool being a predetermined type and having a predetermined wear;

D) machine the material batch with the machining tool, monitor wear of the inserted tool during the machining, and determine a first tool life of the tool;

E) repeat B, C and D to determine a second tool life, while setting a different machining speed in B and inserting a second tool, the first and second tools being the same type;

F) determine coefficients of a model associated with the material batch, based on the machining speed, the different machining speed, the first and the second tool life; and G) determine machinability of the material batch based on the model.

23. The computing device of claim 22, wherein the computing device comprises an edge device.

24. A system for machining comprising a machining tool and the computing device of claim 23 associated with the machining tool.

25. The computing device of claim 22, wherein the edge device is connected to a numerical control device.

26. A system for machining comprising a machining tool and the computing device of claim 22 associated with the machining tool.

* * * * *